United States Patent
VanBlon et al.

(10) Patent No.: US 10,725,630 B2
(45) Date of Patent: Jul. 28, 2020

(54) SELECTING A TARGET APPLICATION BASED ON CONTENT

(71) Applicant: LENOVO (Singapore) PTE. LTD., New Tech Park (SG)

(72) Inventors: Russell Speight VanBlon, Raleigh, NC (US); Robert James Kapinos, Durham, NC (US); Scott Wentao Li, Cary, NC (US); Joaquin F. Luna, Durham, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 502 days.

(21) Appl. No.: 14/987,113

(22) Filed: Jan. 4, 2016

(65) Prior Publication Data
US 2017/0192650 A1    Jul. 6, 2017

(51) Int. Cl.
*G06F 3/0484* (2013.01)
*G06F 3/0482* (2013.01)
*H04L 12/58* (2006.01)
*G06F 16/955* (2019.01)

(52) U.S. Cl.
CPC ........ *G06F 3/04842* (2013.01); *G06F 3/0482* (2013.01); *H04L 51/14* (2013.01)

(58) Field of Classification Search
CPC ............... G06F 3/04842; G06F 3/0482; G06F 16/9554; H04L 51/14
See application file for complete search history.

(56) References Cited

U.S. PATENT DOCUMENTS

| | | | |
|---|---|---|---|
| 8,412,237 B1* | 4/2013 | Ohme | H04W 4/027 455/456.3 |
| 8,972,977 B2* | 3/2015 | Neil | G06F 9/45533 718/1 |
| 9,418,232 B1* | 8/2016 | Khetawat | G06F 21/554 |
| 9,965,484 B1* | 5/2018 | Zhang | G06F 16/16 |
| 2002/0055968 A1* | 5/2002 | Wishoff | G06F 9/542 709/203 |
| 2003/0163490 A1* | 8/2003 | Kitamura | G06F 16/93 |
| 2006/0190988 A1* | 8/2006 | Adams | G06F 21/6236 726/2 |
| 2006/0218492 A1* | 9/2006 | Andrade | G06F 17/24 715/234 |
| 2007/0276795 A1* | 11/2007 | Poulsen | G06Q 90/00 |
| 2010/0125610 A1* | 5/2010 | Zaffino | G06F 16/40 707/793 |
| 2010/0153386 A1* | 6/2010 | Tysowski | G06F 17/30041 707/736 |
| 2011/0246753 A1* | 10/2011 | Thomas | G06F 21/56 713/1 |

(Continued)

FOREIGN PATENT DOCUMENTS

JP    WO 2003001435 A1 *    1/2003    ....... G06F 17/30047

*Primary Examiner* — Ryan F Pitaro
(74) *Attorney, Agent, or Firm* — Kunzler Beam & Adamson

(57) ABSTRACT

Apparatuses, systems, methods, and program products are disclosed for selecting a target application based on content. A content module receives a content element. A characteristic module determines one or more characteristics of the content element. A selection module selects an application to receive the content element based on the one or more characteristics of the content element.

20 Claims, 4 Drawing Sheets

(56) References Cited

U.S. PATENT DOCUMENTS

| | | | | |
|---|---|---|---|---|
| 2012/0284256 A1* | 11/2012 | Mahajan | G06F 8/61 | 707/722 |
| 2012/0293494 A1* | 11/2012 | Kuroume | H04L 67/36 | 345/419 |
| 2012/0306788 A1* | 12/2012 | Chen | G06F 3/0482 | 345/173 |
| 2013/0007902 A1* | 1/2013 | Lurey | G06F 21/31 | 726/30 |
| 2013/0047198 A1* | 2/2013 | Srour | G06F 9/485 | 726/1 |
| 2013/0259293 A1* | 10/2013 | Yu | G06F 21/121 | 382/100 |
| 2013/0346450 A1* | 12/2013 | Procopio | G06F 21/6218 | 707/783 |
| 2014/0136580 A1* | 5/2014 | Chuang | G06F 9/445 | 707/827 |
| 2014/0156843 A1* | 6/2014 | Childs | H04L 65/40 | 709/225 |
| 2014/0236478 A1* | 8/2014 | Mermelstein | G06F 16/16 | 701/454 |
| 2015/0199196 A1* | 7/2015 | Cairns | G06F 8/71 | 717/120 |
| 2015/0312646 A1* | 10/2015 | Dhanabalan | H04N 21/8106 | 725/32 |
| 2015/0341747 A1* | 11/2015 | Barrand | G06Q 30/0201 | 455/405 |
| 2015/0363826 A1* | 12/2015 | Tseng | G06Q 30/0259 | 705/14.57 |
| 2016/0132173 A1* | 5/2016 | Kim | G06F 1/1694 | 345/173 |
| 2016/0283083 A1* | 9/2016 | Fu | G06F 9/451 | |
| 2016/0283088 A1* | 9/2016 | Greenberg | G06F 17/2247 | |
| 2016/0360336 A1* | 12/2016 | Gross | H04W 4/025 | |
| 2017/0139553 A1* | 5/2017 | Rose | G06F 9/445 | |
| 2017/0192650 A1* | 7/2017 | VanBlon | G06F 3/04842 | |
| 2017/0277396 A1* | 9/2017 | Chung | G06F 3/04817 | |
| 2017/0295260 A1* | 10/2017 | Pierce | G06F 9/445 | |
| 2018/0096340 A1* | 4/2018 | Omojola | G06Q 20/3221 | |
| 2018/0164980 A1* | 6/2018 | Huang | G06F 3/04817 | |
| 2018/0188058 A1* | 7/2018 | Dabholkar | G01C 21/3679 | |
| 2018/0329522 A1* | 11/2018 | Hawthorne | G06F 3/0346 | |

* cited by examiner

SELECTING A TARGET APPLICATION BASED ON CONTENT

BACKGROUND

Field

The subject matter disclosed herein relates to content-based application selection and more particularly relates to determining available applications to process content based on characteristics of the content.

Description of the Related Art

Devices may include options to send or forward content from one application to another application. Typically this involves the user scrolling through a list of available applications on the device and selecting an application to receive the content. The list of potential target applications can become long if a large number of applications are installed on the device, and there may not be an easy way to quickly select a target application without navigating the entire list of available applications.

BRIEF SUMMARY

An apparatus for selecting a target application based on content is disclosed. A method and computer program product also perform the functions of the apparatus. In one embodiment, an apparatus includes a processor and a memory that stores code executable by the processor. The executable code, in one embodiment receives a content element. In a further embodiment, the executable code determines at least one characteristic of the content element. The executable code, in another embodiment, selects an application to receive the content element based on the one or more characteristics of the content element.

In one embodiment, the memory further includes code executable by the processor to display a shortcut to the selected application in response to the application being selected. In another embodiment, the memory further comprises code executable by the processor to send the content element to the selected application in response to a user selecting the shortcut to the selected application.

In certain embodiments, the memory further comprises code executable by the processor to present a plurality of shortcuts corresponding to a plurality of selected applications for the content element. In a further embodiment, the memory further comprises code executable by the processor to send the content element to the selected application without user intervention.

In one embodiment, the content element comprises an image and the one or more characteristics of the image comprises one or more objects in the image. The selected application may be selected based on the one or more objects in the image. In various embodiments, the content element comprises a document and the one or more characteristics of the document comprises one or more types of content within the document. The selected application may be selected based on the one or more types of content within the document.

In some embodiments, the one or more characteristics of the content element comprises a history of applications selected to handle content elements having a same type as the received content element. The selected application may be selected based on the history. In one embodiment, the one or more characteristics of the content element comprises a location associated with the content element. The selected application may be selected based on the location.

In various embodiments, the one or more characteristics of the content element comprises a source of the content element. The selected application may be selected based on the source of the content element. In a further embodiment, the one or more characteristics of the content element comprises a time associated with the content. The selected application may be selected based on the time. In certain embodiments, the one or more characteristics of the content element comprises a recently used application associated with a type of the content element. The recently used application may be the selected application.

A method, in one embodiment, includes receiving, by use of a processor, a content element. In a further embodiment, the method includes determining one or more characteristics of the content element. In another embodiment, the method includes selecting an application to receive the content element based on the one or more characteristics of the content element.

In one embodiment, the method includes displaying a shortcut to the selected application in response to the application being selected. In a further embodiment, the method includes presenting a plurality of shortcuts corresponding to a plurality of selected applications for the content element.

In certain embodiments, the content element comprises an image and the one or more characteristics of the content element comprises one or more objects in the image. The selected application may be selected based on the one or more objects in the image. In one embodiment, the one or more characteristics of the content element comprises a history of applications selected to handle content elements having a same type as the received content element. The selected application may be selected based on the history.

In some embodiments, the one or more characteristics of the content element comprises a location associated with the content element. The selected application may be selected based on the location. In a further embodiment, the one or more characteristics of the content element comprises a source of the content element. The selected application may be selected based on the source of the content element.

In one embodiment, a program product includes a computer readable storage medium that stores code executable by a processor. In certain embodiments, the executable code includes code to perform receiving a content element. In another embodiment, the executable code includes code to perform determining one or more characteristics of the content element. In a further embodiment, the executable code includes code to perform selecting an application to receive the content element based on the one or more characteristics of the content element.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
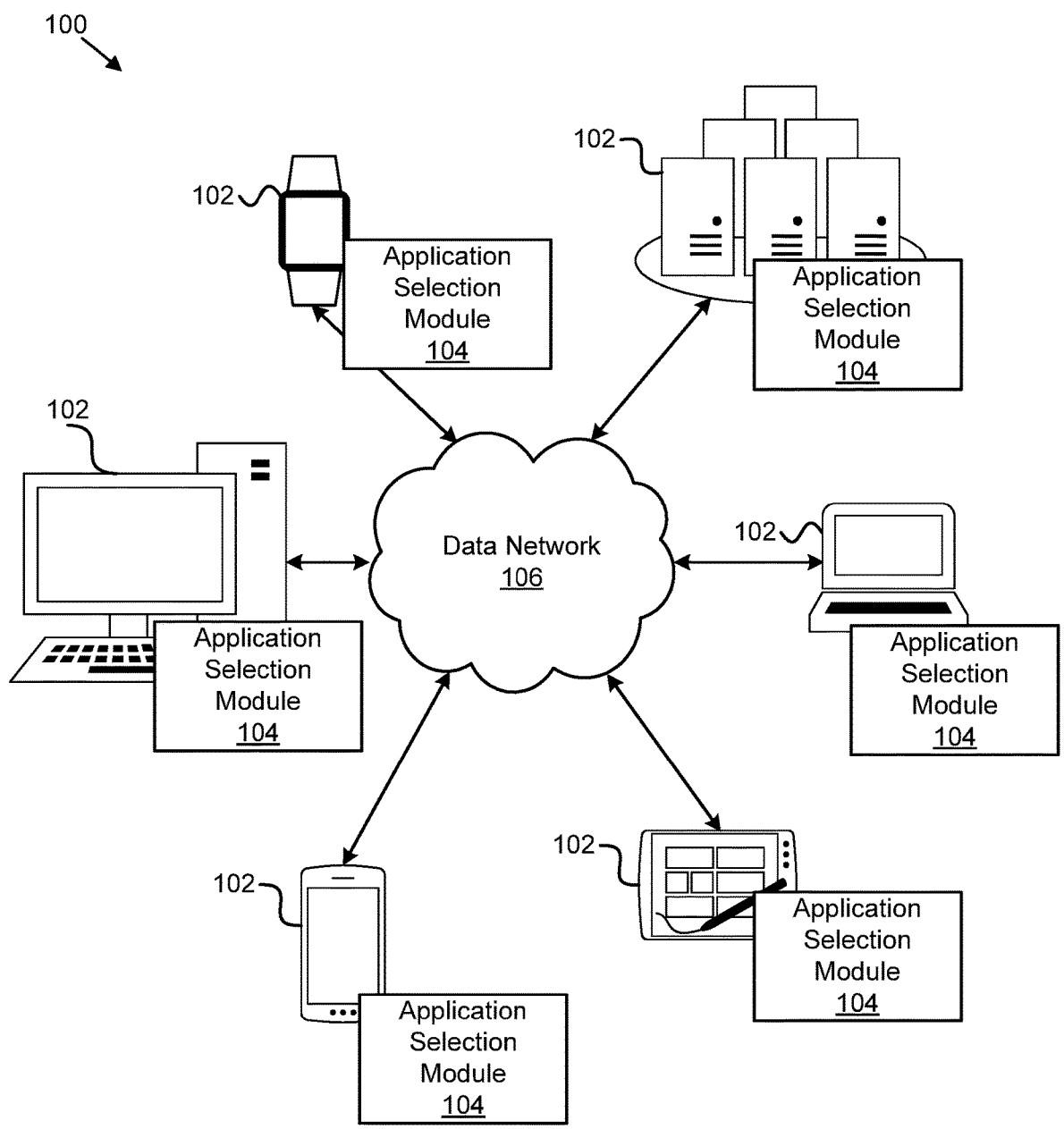
FIG. 1 is a schematic block diagram illustrating one embodiment of a system for selecting a target application based on content.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for selecting a target application based on content. In one embodiment, the system 100 includes information handling devices 102, application selection modules 104, and data networks 106. In certain embodiments, even though a specific number information handling devices 102, application selection modules 104, and data networks 106 are depicted in FIG. 1, one of skill in the art will recognize that any number of information handling devices 102, application selection modules 104, and data networks 106 may be included in the system 100 for context-based program selection.

In one embodiment, the information handling devices 102 include desktop computers, laptop computers, personal digital assistants (PDAs), tablet computers, smart phones, smart televisions (e.g., televisions connected to the Internet), set-top boxes, game consoles, or the like. In some embodiments, the information handling devices 102 include wearable devices, such as smart watches, fitness bands, optical head-mounted displays, or the like.

In certain embodiments, the information handling devices 102 include servers, blade servers, virtual servers, cloud servers, servers of a data center, network servers, remote servers, or the like. The servers may be configured as application servers, email servers, database servers, file servers, game servers, home servers, media servers, web servers, and/or the like. In certain embodiments, the servers are communicatively coupled to other information handling devices 102 via the data network 106 such that the information handling devices 102 may store and/or access data on the servers as it relates to the application selection module 104. For example, servers may store applications, files, programs, metadata, databases, registries, log files, or the like.

The information handling devices 102 may include various storage devices for storing files, such as text files, images, videos, source code, PDF files, music files, or the like. The storage devices may include memory such as flash storage media, hard disk drives, removable storage media, tape drives, solid-state storage media, read-only memory ("ROM"), random access memory ("RAM"), or the like. The information handling devices 102 may be installed with an operating system, such as Microsoft Windows®, Windows Server®, Apple OS X®, various Linux® distributions, Android®, iOS®, Windows Mobile®, or the like. Furthermore, the information handling devices 102 may include a file system that organizes, arranges, or otherwise manages storage and access of various files stored on the information handling devices 102.

The information handling devices 102, in certain embodiments, include one or more installed applications that are configured to process content of various types—images, text documents, PDF documents, music files, videos, etc. For example, a smart phone 102 may include a text messaging application, an email application, a music player, a video player, a photo viewer, a social media application, or the like. One of skill in the art will realize the various applications that may be used to process content on an information handling device 102.

In one embodiment, the application selection module 104 is configured to receive a content element. The application selection module 104, in a further embodiment, is configured to determine one or more characteristics of the file. In various embodiments, the application selection module 104 is configured to select an application to receive the content element based on the one or more characteristics of the content element. The application selection module 104, in one embodiment, includes various modules that perform the functions of the application selection module 104, as described below with reference to FIGS. 2 and 3.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
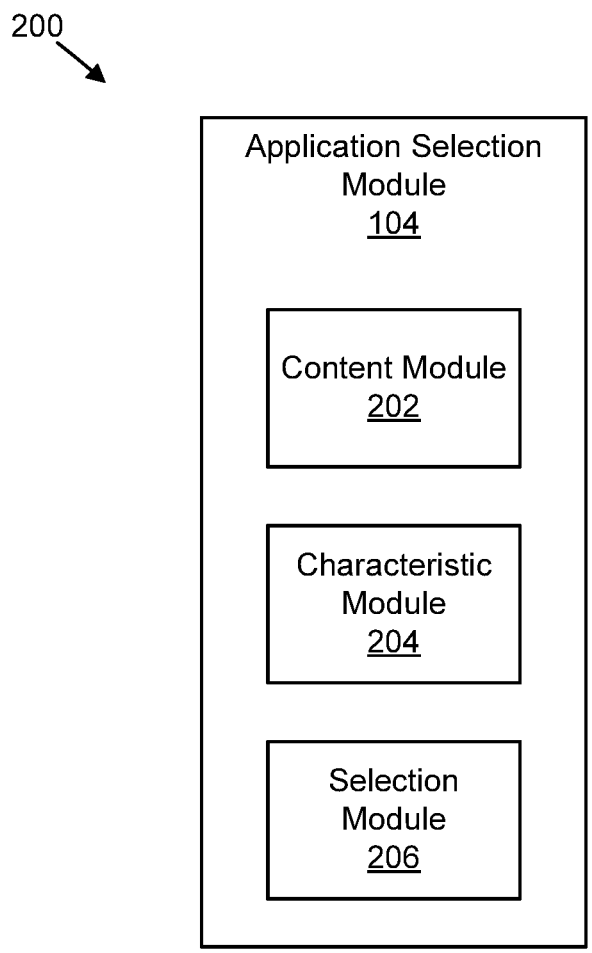
FIG. 2 is a schematic block diagram illustrating one embodiment of a module for selecting a target application based on content.

FIG. 2 is a schematic block diagram illustrating one embodiment of a module 200 for selecting a target application based on content. In one embodiment, the module 200 includes an embodiment of an application selection module 104. The application selection module 104, in various embodiments, includes one or more of a content module 202, a characteristic module 204, and a selection module 206, which are described in more detail below.

The content module 202, in one embodiment, is configured to receive a content element. As described above, a content element may be data on a clipboard, a file, a portion of a file, or the like, associated with an information handling device 102. For example, the file, or portion of the file, may be stored locally on an information handling device 102 or may be stored at a remote location and accessed via the data network 106. Furthermore, as described above, the content element may include an image, a text file, an audio file, an email, a video, a hyperlink, etc., or a portion of the foregoing.

In one embodiment, the content module 202 receives the content element in response to user input. For example, the content module 202 may receive a file, such as an image file, in response to a user selecting the file in a graphical user interface ("GUI"). In another example, the content module 202 may receive a content element comprising a portion of a file in response to a user selecting the portion of the file, such as text selected from a text document, a snippet of a sound file, a clip from a video file, a portion of an image file, or the like.

In a further embodiment, the content module 202 receives the content element in response to a user action. For example, the content module 202 may receive an image in response to a user taking a picture with a camera of an information handling device 102. In another example, the content module 202 may receive a document in response to a user downloading a document from a remote location or receiving an email with the document as an attachment. In yet another example, the content module 202 may receive a video sent as part of a text message or selected by a user in a file system. One of skill in the art will recognize the various ways that content may be selected or received.

The characteristic module 204, in one embodiment, is configured to determine one or more characteristics of the content element. As used herein, a characteristic of the content element may comprise an attribute, a description, an event, or other data that describes at least a portion of the content element. In one embodiment, the characteristics of a content element are stored in metadata associated with the content element. As used herein, metadata associated with the content element may refer to metadata stored together with the content element, metadata for the content element that is stored in an operating system specific location, such as the registry, metadata stored in a remote network location, such as the cloud, or the like.

The metadata, in one embodiment, includes data fields associated with the content element, such as data describing the author/creator of the content element, a file extension, the source of the content element, timestamps describing when the content element was created/modified/last saved, the location of the content element in a file system, the types of content within the content element, applications that have been used to process content elements of that type, or the like.

In one embodiment, the selection module 206 selects an application to receive the content element based on the one or more characteristics of the content element. For example, the selection module 206 may send an image to a text message application, an email application, a social media application, or the like, based on one or more characteristics of the image. The selection module 206 may send the content element to the selected application by providing a command to open the application with the content element as a parameter to the open command, for example. One of skill in the art will recognize various ways that a content element can be sent to a program or application.

In one embodiment, the selection module 206 displays a shortcut to the selected application in response to determining a target application to send the content element to. For example, the selection module 206 may present a link, icon, button, etc. that represents an application that has been selected to receive an image, e.g., after an image is taken, the selection module 206 may present a shortcut to a text messaging application near the image being displayed on a GUI. In one embodiment, the selection module 206 sends the image to the application represented by the shortcut in response to a user selecting the shortcut.

In a further embodiment, the selection module 206 presents a plurality of shortcuts for a plurality of applications selected by the selection module 206 based on the characteristics of the content element. For example, the selection module 206 may present a plurality of shortcuts for available applications that may be configured to process an image, such as a text message application, an email application, a social media application, a photo editing application, or the like. The selection module 206 may present a menu, or similar GUI interface, that includes the shortcuts (e.g., such as icons representing the shortcuts), and which a user can interact with to select an application to send the content element to. In certain embodiments, the menu may presented in response to a user selecting a "share" icon.

In such an embodiment, the selection module 206 may organize, arrange, or otherwise layout the shortcuts according to the characteristics of the content element. For example, if a text messaging application was the most recently used application on the user's device, the selection module 206 may list a shortcut to the text messaging application first, even though an image editing application may be a more appropriate application to send the image to. The selection module 206 may take into account other characteristics of the content element, as described below in more detail. In certain embodiments, the selection module 206 sends the content element to the selected application in response to the user selecting the "share" icon, instead of presenting the menu of application shortcuts.

In one embodiment, the selection module 206 may send the content element to a selected application without any user intervention. In such an embodiment, the selection module 206 may select a target application based on the characteristics of the content element, and automatically send the content element to the target application without the user initiating a "share" action, selecting a shortcut to send the application to, or the like. For example, the selection module 206 may automatically send an image of a QR code to a QR code reader application in response to the characteristic module 204 determining that the image contains a QR code.

In one embodiment where the content element is an image file (e.g., a *.jpg file, a *.png file, a *.bmp file, or the like), the characteristics of the image may include one or more objects within the image. In certain embodiments, the characteristic module 204 performs various image processing techniques (e.g., face recognition, edge detection, etc.) to determine persons, objects, or the like within an image. Based on the objects in the image, the selection module 206 may select an application to send the image to.

For example, the characteristic module 204 may determine a plurality of persons in an image, such as a team picture, and the selection module 206 may select a social media application, such as a Facebook® or Instagram® application, to send the image to. Similarly, the characteristic module 204 may determine that an image includes an image of a QR code, and the selection module 206 may send the image to a QR code reader application.

In a further embodiment, the content element may be a document, such as a text file, that includes a variety of content types, such as formatted text, unformatted text, images, videos, etc. In various embodiments, the characteristic module 204 may determine the types of content within the document, and the selection module 206 may select an application to receive the document based on the content types. For example, if the characteristic module 204 determines that the text document includes formatted text, the selection module 206 may send the document to a rich-text editor. On the other hand, if the characteristic module 204 determines that the text document includes unformatted text, the selection module 206 may send the document to a simple text editor.

In one embodiment, the characteristic module 204 determines a history of applications that have been selected to process content elements that are of the same, or substantially similar, type as the received content element. For example, the characteristic module 204 may determine that image files (e.g., *.jpg files, *.png files, etc.) are typically opened in Photoshop®, meaning that Photoshop® is used more than other applications for image files, and that PDF files are typically opened in Adobe Reader®. Thus, based on the application history, if the content element is an image file, the selection module 206 may send the image file to the Photoshop® application. In some embodiments, the characteristic module 204 checks metadata associated with the content element to determine a history of applications used to open files that have the same, or similar, type as the type of the content element.

In a further embodiment, the characteristic module 204 determines a location associated with the content element. In various embodiments, the location may be a location where the content element was created, where it was last saved or accessed, or the like. In another embodiment, the characteristic module 204 determines the location of the content element based on the data of the content element. For example, the characteristic module 204 may determine the location where an image was taken based on the contents of the image, e.g., the characteristic module 204 may determine that an image was taken at the beach based on detecting the image is an image of the beach.

In one embodiment, the characteristic module 204 determines the location of an image by checking metadata associated with the image. The metadata may include location data such as GPS coordinates, addresses, or the like. For example, when an image is captured using the camera of a smart phone, GPS information for the location where the image was taken may be stored in the metadata. According to the location data, the selection module 206 may select an application to send the content element to. For example, the characteristic module 204 may determine that an image was taken at Disneyland® based on the location data for the image, and the selection module 206 may select a social media application, such as Instagram®, so that the user can share the image on her Instagram® feed.

In one embodiment, the characteristic module 204 determines a source of the content element. The source of the content element may be where the content element was received from (e.g., a user, a website, an FTP site, or the like), who created the content element, or the like. Based on the source of the content element, the selection module 206 may determine which application to send the content element to. For example, if a document was received as an attachment to an email from a work colleague, the selection module 206 may select a storage application, such as Dropbox®, where the document can be archived. Similarly, if an image is received in a text message, the selection module 206 may select an image storage application, such as Google Photos®, to send the image where it can be archived.

In certain embodiments, the characteristic module 204 determines a time, day, season, or the like (referred to collectively as "time") for the content element. The time may be stored in metadata that the characteristic module 204 checks to determine a time associated with the content element. The time may include when the content element was created or saved, the time depicted in the content element, such as in an image, or the like. Based on the time, the selection module 206 may select a target application for the content element. For example, an image of a whiteboard is captured at 10:00 am is likely a work-related image and should be sent to an image archive, whereas an image of a large group of people on Friday night at midnight is likely an image that a user may want to send to a social media application.

In one embodiment, the characteristic module 204 determines a list of recently used applications for a device. Based on the recently used applications, the selection module 206 may select the most recently used application to receive the content element. In certain embodiments, the selected, most recently used application is capable of processing the content element type. For example, if the content element is an image of people, and the most recently used application on the device is a Facebook® application, the selection module 206 may send the image to the Facebook® application instead of other applications that may be configured to handle image files. However, if the content element is an image of a QR code, and the most recently used application on the device is a Facebook® application, the selection module 206 may proceed through the list of recently used applications to determine an appropriate application to process the image of the QR code.

In one embodiment, the selection module 206 selects a target application based on a combination of a plurality of characteristics of a content element. For example, a user may have a history of taking images of an objects in his garage at his house on Saturdays and sending the images to a Craigslist® application. The next time the user takes an image in his garage at his house, the content module 202 may receive the image, and the characteristic module 204 may determine a plurality of characteristics of the image. For example, the characteristic module 204 may determine that an object, such as a bike, lamp, etc., is the subject of the image, the image was taken at the user's house according to GPS data, and the image was taken on a Saturday. Furthermore, the characteristic module 204 may determine which recent applications the user typically uses to process these types of images, which in this example would be the Craigslist® application. Accordingly, based on the determined characteristics, the selection module 206 may present a shortcut to the Craigslist® application so that the user can quickly send the image to the Craigslist® application; may present a menu of shortcuts to applications that could process the content element, with the Craigslist® application being the first listed application, either automatically or in response to user input; or may automatically send the image to the Craigslist® application without receiving any input from the user.

In another example, the content module 202 may receive an image of kids at the beach. The characteristic module 204 may determine that people are the subject of the image, and may further determine the identities of the people in the image (e.g., by using facial recognition, etc.). The characteristic module 204 may also determine that the location of the image is at a beach, either from location data and/or from the content of the image. The characteristic module 204, after identifying the kids in the image, may determine which application is historically used to process images of the kids. For example, a Facebook® application may historically be the application that is used to share images of the kids. Accordingly, based on the determined characteristics, the selection module 206 sends the image to the Facebook® application. If there are multiple applications that could process the image, the selection module 206 may select the most recently used application, may present a menu with links to each application for the user to select from, or the like.

Figure 3:
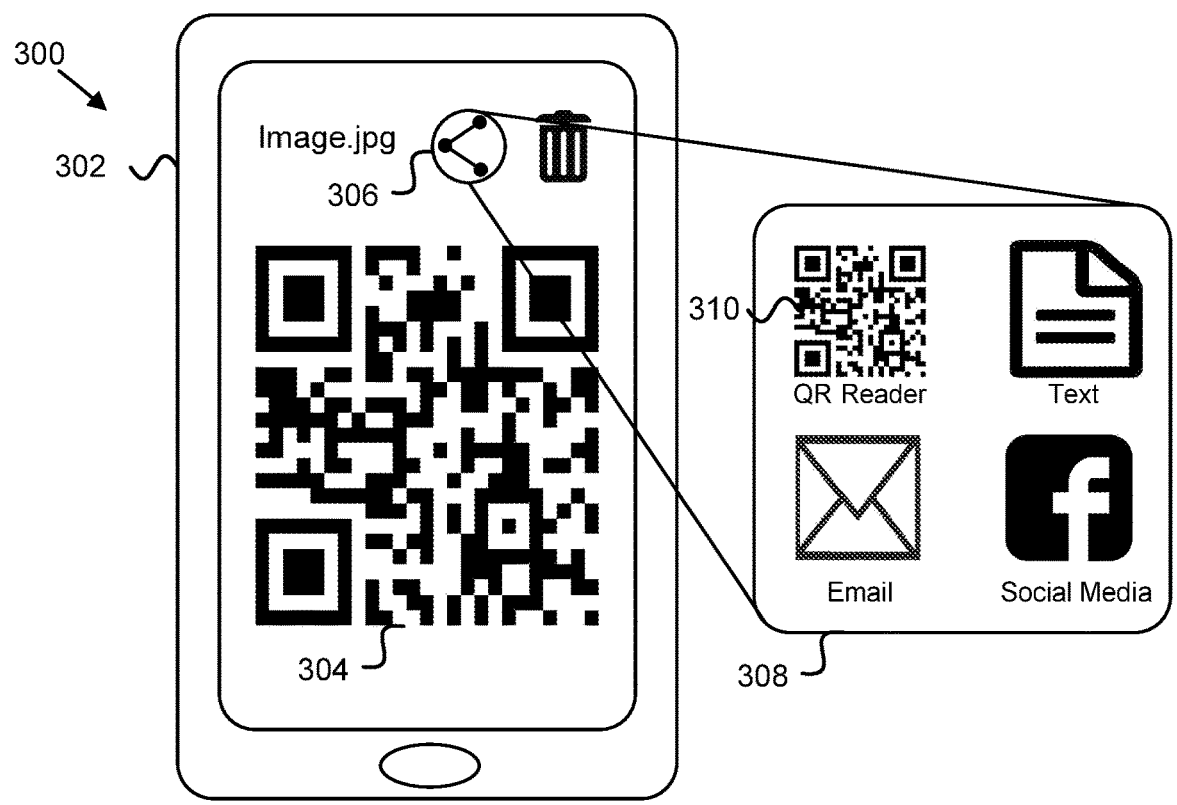
FIG. 3 is a schematic block diagram illustrating one embodiment of an interface for selecting a target application based on content.

FIG. 3 depicts one embodiment of an interface 300 for selecting a target application based on content. In one embodiment, the interface 300 is presented on a smart phone 302, or similar device. As depicted in FIG. 3, the content element may be an image 304 of a QR code. In one embodiment, the content module 202 receives the image of the QR code in response to a user selecting the image 304 from an image gallery, the user capturing the image 304 using a camera on the smart phone 302, the user receiving the image 304 in a text message application, an instant message application, an email application, or the like.

In one embodiment, the characteristic module 204 may determine one or more characteristics of the image 304. For example, the characteristic module 204 may perform image processing techniques to determine that the image 304 is an image of a QR code. Furthermore, the characteristic module 204 may determine the source of the image 304, location information associated with the image 304, applications that have recently been used to process images of QR codes, or the like.

The selection module 206, based on the characteristics of the image 304, determines one or more applications to receive the image 304. In one embodiment, the selection module 206 presents a menu 308 of a plurality of shortcuts 310 to applications that may be configured to process the image 304. In one embodiment, the selection module 206 presents the menu 308 in response to user input. For example, the user may select a "share" icon 306 to trigger the selection module 206 to display the menu 308.

In certain embodiments, the selection module 206 arranges the shortcuts 310 in the menu 308 based on the characteristics of the content element. In one embodiment, instead of arranging the shortcuts according to a predetermined order, such as alphabetically or according to some system-defined order, the selection module 206 dynamically determines the presentation order for the shortcuts 310 according to the characteristics of the image 304. For example, because the characteristic module 204 determined that the image 304 was an image of a QR code, the selection module 206 may determine whether a QR code reader is available on the device 302 and present the shortcut 310 to the QR code reader first in the list. The other shortcuts 310 may be for applications that may be used to process the image 304, but may not be the most appropriate target application for the image 304.

Figure 4:
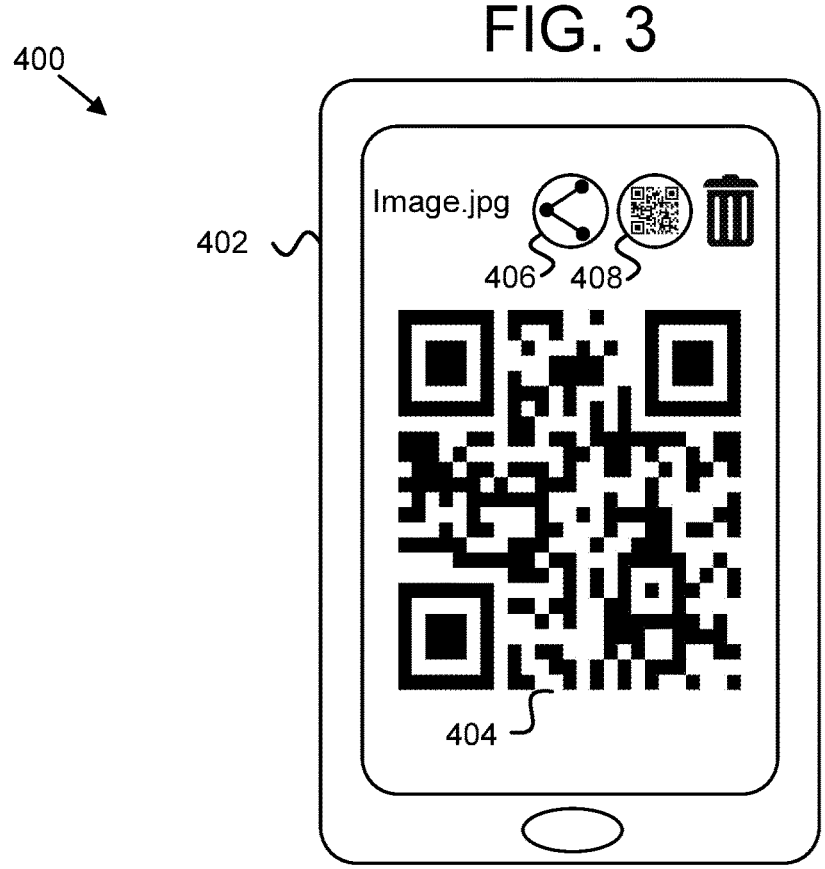
FIG. 4 is a schematic flow chart diagram illustrating one embodiment of another interface for selecting a target application based on content.

FIG. 4 depicts another embodiment of an interface 400 for selecting a target application based on content. The interface 400 may be presented on a smart phone 402, or similar device, and may include an image 404 of a QR code, similar to the embodiment described above with reference to FIG. 3. Like FIG. 3, the interface 400 may include a "share" icon that triggers the selection module 206 to present a menu of shortcuts to applications, as shown in FIG. 3.

In a further embodiment, as illustrated in FIG. 4, the selection module 206 may present a shortcut 408 to the target application that is selected based on the characteristics of the image 404. For example, because the characteristic module 204 determined that the image 404 is an image 404 of a QR code, the selection module 206 may select a QR code reader application to be the target application for the image 404. Additionally, the selection module 408 presents a shortcut 408 to the QR code reader application so that the user does not need to open the menu of shortcuts to select an application to send the image to. In various embodiments, the selection module 206 may automatically send the image 404 to the QR code reader application without any user intervention.

Figure 5:
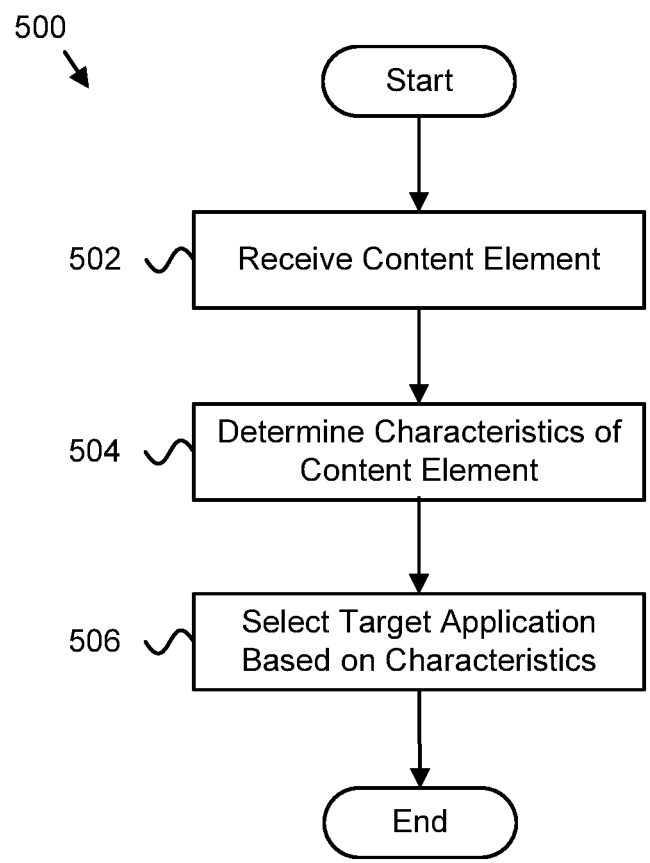
FIG. 5 is a schematic flow chart diagram illustrating one embodiment of a method for selecting a target application based on content.

FIG. 5 is a schematic flow chart diagram illustrating one embodiment of a method 500 for selecting a target application based on content. In one embodiment, the method 500 begins and receives 502 a content element. The method 500 may receive 502 the content element in response to a user selecting a content element, receiving a content element in a text message, email, etc., or the like. The content element may include images, documents, videos, audio files, presentations, web pages, hyperlinks, or the like.

In a further embodiment, the method 500 determines 504 one or more characteristics of the content element, such as the source of the content element, types of content within the content element, a location associated with the content element, a history of applications used to open content elements that have the same type as the received content element, a time associated with the content element, and/or the like.

In one embodiment, the method 500 selects 506 a target application to receive the content element based on the characteristics of the content element. For example, the method 500 may select 506 a rich-text editor to receive the content element if the content element comprises additional information than unformatted text, such as formatted text, images, videos, etc. The method 500 may select 506 a plurality of applications and present shortcuts to the applications in a menu that may be arranged according to the characteristics of the content element. For example, if the content element is an image, the method 500 may present shortcuts to applications in the menu according a most recently used order of applications that have been used to process images. In another embodiment, the method 500 may select 506 a target application and automatically send the content element to the application, and the method 500 ends. In some embodiments, the content module 202, the characteristic module 204, and the selection module 206 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory that stores code executable by the processor to:
        receive a content element;
        determine one or more characteristics of the content element, the one or more characteristics of the content element comprising one or more of metadata for the content element and a type of the content element;
        determine a history of one or more applications that were previously selected to open content elements having the same type as the content element;
        order the one or more applications in the application history in order of applications that were most recently used;
        automatically determine an application to receive the content element from the application history based on the one or more characteristics of the content element, the one or more characteristics comprising a physical location associated with the content element determined from the metadata, wherein the most recently used application in the application history is selected for opening the content element in response to the most recently used application previously being used to open content elements with the same associated physical location, otherwise a different application in the application history is selected to open the content element based on the location associated with the content element; and
        send the content element to the determined application automatically without further user intervention.

2. The apparatus of claim 1, wherein the memory further comprises code executable by the processor to:
    display a graphical shortcut representing the determined application, the determined application being executed and used for opening the content element in response to the graphical shortcut being selected; and
    send the content element to the determined application in response to a user selecting the shortcut to the determined application.

3. The apparatus of claim 1, wherein the memory further comprises code executable by the processor to present a plurality of shortcuts corresponding to a plurality of determined applications that are configured to open the content element.

4. The apparatus of claim 1, wherein the content element comprises an image and the metadata for the content element further comprises one or more objects in the image, the determined application being determined based on the one or more objects in the image.

5. The apparatus of claim 4, wherein the physical location of the content element is further determined based on the one or more objects in the image.

6. The apparatus of claim 4, wherein the determined application comprises a social media application in response to the one or more objects in the image comprising one or more persons.

7. The apparatus of claim 1, wherein the content element comprises a document and the metadata for the content element further comprises one or more types of content within the document, the determined application being determined based on the one or more types of content within the document.

8. The apparatus of claim 1, wherein the metadata for the content element further comprises a source of the content element, the determined application being determined based on the source of the content element.

9. The apparatus of claim 1, wherein the metadata for the content element further comprises a time associated with the content, the determined application being determined based on the time.

10. The apparatus of claim 9, wherein the time comprises a time when the content element was created, the time stored as a timestamp in the metadata for the content element.

11. The apparatus of claim 1, wherein the code is executable by the processor to send the content element to the determined application by providing a command to open the application with the content element as a parameter to the open command.

12. A method comprising:
    receiving, by use of a processor, a content element;
    determining one or more characteristics of the content element, the one or more characteristics of the content element comprising one or more of metadata for the content element and a type of the content element;
    determining a history of one or more applications that were previously selected to open content elements having the same type as the content element;
    ordering the one or more applications in the application history in order of applications that were most recently used;
    automatically determining an application to receive the content element from the application history based on the one or more characteristics of the content element, the one or more characteristics comprising a physical location associated with the content element determined from the metadata, wherein the most recently used application in the application history is selected for opening the content element in response to the most recently used application previously being used to open content elements with the same associated physical location, otherwise a different application in the application history is selected to open the content element based on the location associated with the content element; and
    sending the content element to the determined application automatically without further user intervention.

13. The method of claim 12, further comprising presenting a plurality of shortcuts corresponding to a plurality of determined applications for the content element.

14. The method of claim 12, wherein the content element comprises an image and the metadata for the content element further comprises one or more objects in the image, the determined application being selected based on the one or more objects in the image.

15. The method of claim 14, wherein the physical location of the content element is further determined based on the one or more objects in the image.

16. The method of claim 14, wherein the determined application comprises a social media application in response to the one or more objects in the image comprising one or more persons.

17. The method of claim 12, wherein the metadata for the content element further comprises a source of the content element, the determined application being determined based on the source of the content element.

18. The method of claim 12, further comprising sending the content element to the determined application by providing a command to open the application with the content element as a parameter to the open command.

19. The method of claim 12, wherein the metadata for the content element further comprises a time associated with the content, the time comprising a time when the content element was created, the time stored as a timestamp in the metadata for the content element.

20. A program product comprising a computer readable storage medium that is not a transitory signal and that stores code executable by a processor, the executable code comprising code to perform:

receiving a content element;

determining a history of one or more applications that were previously selected to open content elements having the same type as the content element;

ordering the one or more applications in the application history in order of applications that were most recently used;

automatically determine an application to receive the content element from the application history based on the one or more characteristics of the content element, the one or more characteristics comprising a physical location associated with the content element determined from the metadata, wherein the most recently used application in the application history is selected for opening the content element in response to the most recently used application previously being used to open content elements with the same associated physical location, otherwise a different application in the application history is selected to open the content element based on the location associated with the content element; and send the content element to the determined application automatically without further user intervention.

\* \* \* \* \*